(12) United States Patent
Blondé et al.

(10) Patent No.: US 8,259,128 B2
(45) Date of Patent: Sep. 4, 2012

(54) IMAGE PROCESSING METHOD FOR INCREASING THE BLURRING OF PIRATED IMAGES

(75) Inventors: Laurent Blondé, Thorigné-Fouillard (FR); Pascal Bourdon, Le Grand Fougeray (FR); Patrick Morvan, Laillé (FR)

(73) Assignee: Thomson Licensing, Boulogne-Billancourt (FR)

( * ) Notice: Subject to any disclaimer, the term of this patent is extended or adjusted under 35 U.S.C. 154(b) by 847 days.

(21) Appl. No.: 12/086,814

(22) PCT Filed: Dec. 19, 2006

(86) PCT No.: PCT/EP2006/069921
§ 371 (c)(1),
(2), (4) Date: Dec. 9, 2008

(87) PCT Pub. No.: WO2007/071678
PCT Pub. Date: Jun. 28, 2007

(65) Prior Publication Data
US 2009/0184978 A1    Jul. 23, 2009

(30) Foreign Application Priority Data
Dec. 20, 2005    (FR) ..................................... 05 53964

(51) Int. Cl.
*G09G 5/02* (2006.01)
*G09G 5/00* (2006.01)

(52) U.S. Cl. ......... 345/590; 345/591; 345/647; 382/162
(58) Field of Classification Search ................ 345/647, 345/590, 591; 382/162, 165
See application file for complete search history.

(56) References Cited

U.S. PATENT DOCUMENTS

| | | |
|---|---|---|
| 2003/0234911 A1 | 12/2003 | Horvath et al. |
| 2004/0081318 A1 | 4/2004 | Bilobrov et al. |
| 2007/0121996 A1 | 5/2007 | Blonde et al. |
| 2010/0098288 A1 * | 4/2010 | Thiebaud et al. ............. 382/162 |

FOREIGN PATENT DOCUMENTS

| | | |
|---|---|---|
| EP | 1414250 | 4/2004 |
| FR | 2859857 | 3/2005 |
| WO | WO 2006/076174 | 7/2006 |

OTHER PUBLICATIONS

Search Report Dated Apr. 17, 2007.

* cited by examiner

*Primary Examiner* — Chante Harrison
(74) *Attorney, Agent, or Firm* — Tutunjian & Bitetto, P.C.

(57) ABSTRACT

The image is broken down into a breakdown color space. For each broken down source pixel, if a source point $P_{S0j}$ is used to represent the end of the color source vector $OP_{S0j}$ associated with said source pixel, component points $P_{1j}, P_{2j}, \ldots, P_{kj}, \ldots, P_{nj}$ are used to represent the ends of the color component vectors $OP_{1j}, OP_{2j}, \ldots, OP_{kj}, \ldots, OP_{nj}$ associated with the component pixels, if a limit sphere of radius $L_{S0j}$ is defined, centered on the point $P_{S0j}$, then said breakdown is such that the following applies: $P_{S0}P_{j1}, P_{S0}P_{j2}, P_{S0}P_{jk}, \ldots, P_{S0}P_{jn} \geq K_{S0j} \times L_{S0j}$, with $K_{S0j} \geq 0.5$. The effectiveness of the scrambling is then significantly enhanced.

14 Claims, 4 Drawing Sheets

IMAGE PROCESSING METHOD FOR INCREASING THE BLURRING OF PIRATED IMAGES

CROSS-REFERENCES TO RELATED APPLICATIONS

This application claims the benefit, under 35 U.S.C. §365 of International Application PCT/EP2006/069921, filed Dec. 19, 2006, which was published in accordance with PCT Article 21(2) on Jun. 28, 2007 in French and which claims the benefit of French patent application No. 0553964, filed Dec. 20, 2005.

BACKGROUND

1. Technical Field

The invention relates to a method of processing a source image ($I_S$) comprising a step for decomposing this image ($I_S$) into a series of "component" images ($I_{C1}, I_{C2}, \ldots, I_{Ck}, \ldots, I_{Cn}$) which are different, said decomposition being adapted so that the successive viewing of the images of this series at a frequency greater than the color fusion frequency for the human eye produces a fused image ($I_F$) which is identical or quasi-identical to said source image.

2. Description of the Related Art

Such an image processing method is described in the document WO05/027529—THOMSON.

Generally, the difference between the "component" images relates to a plurality of pixels that is large enough to be more than perceptible to the eye. Thus, in cases of illegal photographing, for example using a camcorder that is not synchronized with the duly processed source images, a difference appears at the level of this plurality of pixels when illegally stored images are viewed, which degrades and considerably scrambles the viewing.

A match between the source image and the fused image means that any differences between these two images are not perceptible to the eye, so as not to degrade the direct, and therefore legal, viewing of the images.

Generally, to display an image using an image display device comprising a display screen provided with a two-dimensional matrix of elementary polychrome displays, and means for controlling each elementary display according to a video data triplet, there is associated with each pixel of this image, on the one hand, a display of the screen, on the other hand a video data triplet ($D_R, D_G, D_B$) and each display of the screen with which a pixel of the image is associated is controlled using the video data triplet ($D_R, D_G, D_B$) associated with this pixel. By convention, each video data triplet associated with a pixel of the image to be displayed forms, in a color space linked to the display device, the coordinates of what is called the color vector of this pixel. By definition, the set of the possible values of the video data or color vector triplets describes, in this color space associated with the device, a three-dimensional color gamut.

In the case of the display of television sequences, the video data is generally standardized, for example in the PAL system or in the NTSC system, which are both so-called luminance-chrominance systems. To display an image, a PAL image display device therefore receives, in the form of electrical signals, the video data triplets, generally denoted (Y, U, V), which correspond to the set of the color vectors and therefore of the pixels of this image, in the PAL color space linked to this device. Similarly, to display an image, an NTSC image display device therefore receives, in the form of electrical signals, the video data triplets, generally denoted (Y, I, Q), which correspond to the set of the color vectors and therefore of the pixels of this image, in the NTSC color space linked to this device. By extension, the terms YUV and YIQ spaces are used, in which Y designates the luminance, and in which U and V, or I and Q, designate the chrominance.

The video data is generally "gammatized" (set to the power of a "gamma" factor) to take account of the voltage response of cathode ray tube displays.

When it is applied to the display of an image sequence using an image display device, the image processing method described in the abovementioned document WO05/027529 results in an image display method.

As indicated in this document, such a display method then makes it possible:

on the one hand, to display any sequence of processed source images so that the observer perceives the source images of this sequence as if none of it were processed;

on the other hand, to scramble the photographing of the display of this sequence of processed images, that might be attempted by an ill-intentioned person, notably using a camcorder that is not synchronized with the sequence of source images.

In this document, the decomposition of the source images is performed in a color space denoted YUV, that is a PAL color space; as indicated hereinabove, this space depends on the image display device used to display the images of the sequence. To decompose a pixel of the source image $I_1$, to which corresponds a color vector of coordinates ($Y_1, U_1, V_1$) in this color space, this "source" vector is decomposed into two "component" vectors respectively of coordinates ($Y_3, U_3, V_3$), ($Y_4, U_4, V_4$), in which $Y_1 = Y_3 = Y_4$; again according to this document, the values of $U_3, V_3, U_4, V_4$ are determined so that the ends $C_3$ and $C_4$ of these two "component" vectors:

have a barycenter which corresponds to the end $C_1$ of the color source vector, that is, are symmetrical relative to this end $C_1$ in the same PAL color space linked to the display device;

are located in the color gamut of this device.

Thus, the essential criteria for the decomposition of a color vector of a pixel of the source image into two color vectors, each associated with a pixel of a component image are that, in the color space YUV, for example, the points $C_1, C_3$ and $C_4$ are aligned and that the Euclidian distance $C_1C_3$ is equal to the Euclidian distance $C_1C_4$.

It has been observed that the decomposition of source images as described in the document WO05/027529 did not always result in an effective scrambling of the images after illegal recording, for example using a camcorder. One aim of the invention is to enhance the scrambling of the processed images.

SUMMARY

To this end, there is notably proposed a means for increasing the differences between the composite images by a refinement of the decomposition of the source images.

To this end, the subject of the invention is a method of processing a source image $I_{S0}$, in which said source image $I_{S0}$ is decomposed in a decomposition color space into a series of n "component" images $I_{C1}, I_{C2}, \ldots, I_{Ck}, \ldots, I_{Cn}$ and in which each source pixel $E_{S0j}$ which belongs to a plurality of decomposed pixels $E_{S01}, E_{S02}, \ldots, E_{S0j}, \ldots, E_{S0q}$ of this source image $I_{S0}$ has a corresponding series of component pixels $E_{C1j}, E_{C2j}, \ldots, E_{Ckj}, \ldots, E_{Cnj}$ respectively in each of said component images $I_{C1}, I_{C2}, \ldots, I_{Ck}, \ldots, I_{Cn}$, wherein, if, in said decomposition space, the set of the color vectors accessible to a display device intended to display said source image forms a three-dimensional gamut of colors, and if, for each source pixel $E_{S0j}$ which belongs to said plurality of decomposed pixels $E_{S01}, E_{S02}, \ldots, E_{S0j}, \ldots, E_{S0q}$, a source point $P_{S0j}$ is used to represent the end of the color source vector $OP_{S0j}$ associated with said source pixel $E_{S0j}$, and component points $P_{1j}, P_{2j}, \ldots, P_{kj}, \ldots, P_{nj}$ are used to represent the ends of the color component vectors $OP_{1j}, OP_{2j}, \ldots, OP_{kj}, \ldots, OP_{nj}$ associated with said component pixels $E_{C1j}, E_{C2j}, \ldots, E_{Ckj}, \ldots, E_{Cnj}$ of the series which corresponds to said source pixel ($E_{S0j}$), said decomposition is such that, for each source pixel ($E_{S0j}$) of said plurality, said component points $P_{1j}, P_{2j}, \ldots, P_{kj}, \ldots, P_{nj}$ associated with the component pixels ($E_{C1j}, E_{C2j}, \ldots, E_{Ckj}, \ldots, E_{Cnj}$) corresponding to said source pixel ($E_{S0j}$) are all located in said three-dimensional color gamut and the barycenter of said component points $P_{1j}, P_{2j}, \ldots, P_{kj}, \ldots, P_{nj}$ corresponds approximately to said source point $P_{S0j}$, and, also for each source pixel ($E_{S0j}$) of said plurality, if, still within said decomposition space, there is defined a limit sphere which is centered on the source point $P_{S0j}$ associated with said source pixel ($E_{S0j}$) and the surface of which contains a series of n "limit" points $P_{1jL}, P_{2jL}, \ldots, P_{kjL}, \ldots, P_{njL}$, the barycenter of which approximately coincides with the source point $P_{S0j}$ and which present the greatest possible distance between them while being included, including limits, in said three-dimensional gamut, and, if a scrambling factor $K_{S0j}$ of said source pixel $E_{S0j}$ of said source image $I_{S0}$ is defined which is less than or equal to 1 and greater than or equal to 0.5, said decomposition is also such that the distances between said source point $P_{S0j}$ and each of said component points $P_{1j}, P_{2j}, \ldots, P_{kj}, \ldots, P_{nj}$ associated with the component pixels ($E_{C1j}, E_{C2j}, \ldots, E_{Ckj}, \ldots, E_{Cnj}$) corresponding to said source pixel ($E_{S0j}$) are all greater than or equal to $K_{S0j}$ times the radius $L_{S0j}$ of said limit sphere.

The source image comprises q pixels which are decomposed, the other pixels of this source image not then being decomposed; the pixels that are not decomposed remain as such unchanged in each of the component images; conversely, each decomposed pixel has a corresponding series of n component pixels, at least two of the pixels of this series being different, so that the n "component" images $I_{C1}, I_{C2}, \ldots, I_{Ck}, \ldots, I_{Cn}$ are effectively differentiated; the set of the decomposed pixels $E_{S01}, E_{S02}, \ldots, E_{S0j}, \ldots, E_{S0q}$ of the source image form a plurality of q decomposed pixels.

Each pixel of the image to be decomposed is generally associated with a video data triplet ($D_R, D_G, D_B$) which is able to control an elementary display of a display device so as to obtain the display of said pixel, and which by convention forms the coordinates of the color vector associated with said pixel of this image in a color space associated with said device; the set of the possible values of the video data triplets then describes, in this color space associated with said device, a three-dimensional gamut of colors, which can be transposed into the decomposition color space, at least in the case where the decomposition color space is different from the color space linked to the device.

$K_{S0j}$ is therefore the scrambling factor of a pixel $E_{S0j}$ of the source image $I_{S0}$. The following then apply: $P_{S0}P_{j1} \geq K_{S0j} \times L_{S0j}$; $P_{S0}P_{j2} \geq K_{S0j} \times L_{S0j}, \ldots, P_{S0}P_{jk} \geq K_{S0j} \times L_{S0j}, \ldots, P_{S0}P_{jn} \geq \times K_{S0j} \times L_{S0j}$. It should be noted that this scrambling factor is differentiated from the metamerization parameter $t_4$ defined in the document US2004/081318 which proposes another solution for enhancing the scrambling: instead of a sequential decomposition of source images as in the invention, this document proposes to "encode", without decomposing them, the source images into at least four primary colors (instead of three), so as to have a freedom parameter ($t_4$) that can be used to scramble a camcorder (see §30); this document does not define any scrambling optimization criterion which is related to the position of the ends of color vectors in a sphere of the color space, as in the invention; it should be noted that the two methods can be used simultaneously without departing from the invention.

Said display device used to display the decomposed images can be a virtual device; for example, if the color space linked to the device is of YUV type, the associated virtual device is a PAL television.

In the decomposition color space, each series of n "component" images ($I_{C1}, I_{C2}, \ldots, I_{Ck}, \ldots, I_{Cn}$) is differentiated by a plurality of component pixels of which the resultant of the color vectors is equal or quasi-equal to n times the color vectors associated with the decomposed pixels ($I_{S01}, E_{S02}, \ldots, E_{S0j}, \ldots, E_{S0q}$) of said source image ($I_{S0}$). The resultant of the component color vectors $OP_{1j}, OP_{2j}, \ldots, OP_{kj}, \ldots, OP_{nj}$ associated with the component pixels ($E_{C1j}, E_{C2j}, \ldots, E_{Ckj}, \ldots, E_{Cnj}$) of each component image ($I_{C1}, I_{C2j}, \ldots, I_{Ck}, \ldots, I_{Cn}$) is therefore equal or quasi-equal to n times the color source vector $OP_{S0j}$ associated with the decomposed source pixel $E_{S0j}$ of the source image $I_{S0}$, in as much as the fusion of the component pixels gives, approximately for the eye, the source pixel; the term "fusion" should be understood to mean the perception of the eye on the successive display of each component image at a frequency greater than that of the fusion of the colors to the eye. The ends $P_{S0j}, P_{1j}, P_{2j}, \ldots, P_{kj}, \ldots, P_{nj}$ of the color vectors are then arranged so that the barycenter of the component points $P_{1j}, P_{2j}, \ldots, P_{kj}, \ldots, P_{nj}$ corresponds to the source point $P_{S0j}$; preferably, the luminance values corresponding to the set of these color vectors are identical ($Y_{S0j} = Y_{1j} = Y_{2j} = \ldots = Y_{kj} = \ldots = Y_{nj}$ then applies).

Only a plurality of pixels of the source image are decomposed, the other so-called "unchanging" pixels being carried as such into each of the component images; in a source image, this plurality of decomposed pixels can form a pattern, such as, for example, a message stating the copyrights attached to the image. The position and the size of the pattern that appears in the component images can advantageously be adapted to optimize the perception of them by the eye, so as to further increase the scrambling. According to a variant, most of the pixels of the source image are decomposed, and it is the "unchanging" pixels which form a pattern that is inscribed, as it were, in "negative" on the image.

Said decomposition space can be a YUV (PAL) or YIQ (NTSC) space, these being spaces linked to a display device; it can also be a space XYZ, Yxy, or linearly derived from these spaces, like the Ycd space described hereinbelow, which are luminance-chrominance spaces independent of the display device; other color spaces can be used for the decomposition without departing from the invention.

Preferably, said decomposition space is a perceptually uniform color space. Thanks to the choice of this decomposition space, not only does the source image processing according to the invention make it possible to guarantee a greater difference than in the prior art between the component images of this source image, but also this difference is now optimized from the point of view of perception by the human eye, which makes it possible to further enhance the scrambling. For the perceptually uniform decomposition space, it is possible to choose the space CIE-LAB, the space CIE-LUV, or the space QMH, or even the space JCH.

When applied to the display of a sequence of source images at a given source frequency using a display device, the image processing method according to the invention makes it possible to guarantee, for each decomposed source image, a greater difference than in the prior art between the component images of this source image, which makes it possible to optimize the scrambling of the images. The component images of each series are then displayed at a frequency equal to n times the source frequency, which is greater than the color fusion frequency for the human eye. For each given decomposed source image $I_{S0}$, a minimum difference, linked to the factors $K_{S0j}$, is assured. Preferably, the factor $K_{S0j}$ is common to all the decomposed pixels of the source image $I_{S0}$. Moreover, this difference is optimized in relation to the display capabilities of the device, since the color vectors associated with the pixels of the component images remain within, limits included, the three-dimensional color gamut of this device.

According to first variant, for said decomposition, the decomposition space comprises the absolute luminance quantity and, one of the coordinates of said source point $P_{S0j}$ then corresponding to a luminance $Y_{S0j}$, then, for said decomposition, the series of the n "limit" points $P_{1jL}, P_{2jL}, \ldots, P_{kjL}, \ldots, P_{njL}$, the series of the n component points $P_{1j}, P_{2j}, \ldots, P_{kj}, \ldots, P_{nj}$ are chosen in one and the same constant luminance plane corresponding to the luminance coordinate $Y_{S0j}$ of said source point. Obviously, said source point $P_{S0j}$ also belongs to this constant luminance plane.

If a two-dimensional gamut is then defined by the intersection of the constant luminance plane $Y_{S0j}$ with said three-dimensional gamut still transposed into said decomposition color space, then the n "limit" points $P_{1jL}, P_{2jL}, \ldots, P_{kjL}, \ldots, P_{njL}$ are positioned on a circle of radius $L_{S0j}$ which is included, including limit, in said two-dimensional gamut.

According to a second variant, for said decomposition, the series of the n component points $P_{1j}, P_{2j}, \ldots, P_{kj}, \ldots, P_{nj}$ are chosen so as not to belong to any plane perpendicular to one of the reference axes of said decomposition space. In particular, if the decomposition space comprises the absolute luminance quantity, the decomposition then leads to a luminance modulation.

Preferably, this second variant is used notably for processing a sequence of source images in which each of the source images is processed according to the invention, and the decompositions of said source images are carried out so that the succession of the series of component pixels corresponding to the decomposed pixels of these source images result in a luminance fluctuation at a frequency less than the flicker limit frequency of the human eye, preferably less than or equal to 20 Hz. Preferably, said source space comprises the luminance quantity. For example, in the case of two successive source images $I_{S0-a}$, $I_{S0-b}$ of a sequence that are each decomposed into two component images $I_{C1-a}$, $I_{C2-a}$ and $I_{C1-b}$, $I_{C2-b}$, each decomposed pixel $E_{S0j-a}$ of the first source image $I_{S0a}$ will be decomposed into two component pixels, $E_{C1j-a}$, $E_{C2j-a}$, so that the luminance of the first component pixel $E_{C1j-a}$ is greater than that of the second component pixel $E_{C2j-a}$; each decomposed pixel $E_{S0j-b}$ of the second source image $I_{S0-b}$ will be decomposed into two component pixels $E_{C1j-b}$, $E_{C2j-b}$ so that the luminance of the first component pixel $E_{C1j-b}$ is in this case, conversely, less than that of the second component pixel $E_{C2j-b}$; then, the succession of two source pixels $E_{S0j-a}$-$E_{S0j-b}$, which is reflected by the following succession of the component pixels: $E_{C1j-a}$-$E_{C2j-a}$-$E_{C1j-b}$-$E_{C2j-b}$, will produce a luminance fluctuation which, when it is convoluted with the frequency of the shutter of a camcorder, will generate a flicker, making the illegal photograph unusable. The scrambling of the images is therefore further enhanced, but it is important here to be careful in particular not to degrade the display of the images by avoiding this flicker effect when "legally" displaying the images.

Preferably, whether for the first or the second variant, said scrambling factor $K_{S0}=K_{S0j}$ is common to said plurality of decomposed pixels ($I_{S01}, E_{S02}, \ldots, E_{S0j}, \ldots, E_{S0q}$) of said source image $I_{S0j}$. The following then applies: $K_{S01}=K_{S02}=\ldots K_{S0j}=\ldots=K_{S0q}=K_{S0}$.

Preferably, said scrambling factor $K_{S0j}$ is greater than or equal to 0.8. The differences between the component images of the source images is further enhanced and the scrambling of the images is further increased.

Preferably, said component points $P_{1jL}, P_{2j}, \ldots, P_{kj}, \ldots, P_{nj}$ forming the edges of a polyhedron, said polyhedron is equilateral and centered on said source point $P_{S0}$. These component points $P_{1j}, P_{2j}, \ldots, P_{kj}, \ldots, P_{nj}$ are therefore on one and the same sphere, or, as appropriate, one and the same circle, centered on $P_{S0}$, and of radius $K_{S0j} \times L_{S0j}$. Thanks to the equilateral nature of the polyhedron, that is, to the equidistance of the component points, the differences between the component images of the source images are further enhanced and the scrambling of the images is further increased.

Another subject of the invention is a method of processing a sequence of source images in which at least one of said images is processed according to the invention, in which, if each source pixel ($E_{S0j}$) of at least one processed source image $I_{S0}$ which belongs to said plurality of decomposed pixels ($E_{S01}, E_{S02}, \ldots, E_{S0j}, \ldots, E_{S0q}$) has associated with it a motion vector and there is defined an upper scrambling limit $M_{S0j}$ of said source pixel $E_{S0j}$ which is greater than the scrambling factor $K_{S0j}$ associated with said source pixel and which is such that the distances between the end $P_{S0j}$ of the color source vector associated with said source pixel ($E_{S0j}$) and each of the ends $P_{1j}, P_{2j}, \ldots, P_{kj}, \ldots, P_{nj}$ of the color component vectors associated with the component pixels ($E_{C1j}, E_{C2j}, \ldots, E_{Ckj}, \ldots, E_{Cnj}$) corresponding to said source pixel ($E_{S0j}$) are all less than or equal to $M_{S0j}$ times the radius $L_{S0j}$ of the limit sphere associated with said source pixel ($E_{S0j}$), then, for each ($E_{S0j}$) of said source pixels of said plurality, said upper scrambling limit $M_{S0j}$ is inversely proportional to the modulus of the motion vector of said source pixel ($E_{S0j}$).

According to the invention, the difference between the component images of a given source image is therefore reduced in the areas of this source image which are affected by a significant motion in the course of the video sequence of images to be displayed. When the sequence of source images is derived from a decompression operation using standardized protocols, for example of MPEG type, the motion vector data is immediately available for each pixel of these images; this motion vector can be common to the various pixels of one and the same decompression macro block.

Preferably, so as to obtain a motion-dependent sliding "scrambling band", still for each $E_{S0j}$ of said source pixels of the plurality of decomposed pixels, the scrambling factor $K_{S0j}$ associated with said source pixel is inversely proportional to the modulus of the motion vector of this source pixel ($E_{S0j}$).

Preferably, the scrambling factor is common to said plurality of decomposed pixels of each source image $I_{S0j}$. According to a variant, the scrambling factor is also common to all the source images.

Another subject of the invention is a method of displaying a sequence of images intended for a given source frequency, comprising at least one series of component images ($I_{C1}$, $I_{C2}, \ldots, I_{Ck}, \ldots, I_{Cn}$) obtained by the processing of at least one source image $I_{S0}$ according to the invention, or by the processing of a sequence of images according to the invention, in which each ($I_{Ck}$) of said "component" images is successively displayed at a component frequency which is equal to n times said source frequency and which is greater than the color fusion frequency of the human eye.

With reference to FIG. 3, another subject of the invention is a device 300 for displaying a source image, each pixel of which is associated with a video data triplet ($D_R$, $D_G$, $D_B$), comprising:

a display panel 302 comprising a two-dimensional matrix of elementary polychrome displays;

control means 304 able to control each elementary display using a video data triplet ($D_R$, $D_G$, $D_B$) associated with a pixel so as to obtain the display of this pixel;

means 306 able to process the source image to be displayed according to the invention, so as to generate a series of component images of said source image;

in which said control means are adapted to successively display each component image at a frequency greater than the color fusion frequency.

An exemplary elementary display of a display screen would be a group of three liquid-crystal or micro-mirror valves modulating in three different primary colors, or a group of three light-emitting diodes emitting in three different primary colors. In the case of a projection display device in which the light of a source is modulated by a liquid crystal or micro-mirror valve micro-imager, each elementary display is formed by a value.

BRIEF DESCRIPTION OF DRAWINGS

The invention will be better understood from reading the description that follows, given by way of nonlimiting example, and with reference to the appended figures in which.

DETAILED DESCRIPTION OF PREFERRED EMBODIMENTS

There now follows a description of an embodiment of the processing method according to the invention applied to the display of a sequence of images by using an image display device provided with a screen comprising a matrix of display elements and provided with means of controlling these display elements, in which, to obtain the display of a given image, each pixel of this image has associated with it a video data triplet ($D_R$, $D_G$, $D_B$) which, when it is addressed to the display element that corresponds to this pixel, via the control means of this device, generates the display of this pixel. Each image of the sequence is partitioned into a pixel matrix, so that each display element corresponds to a pixel of this matrix.

Such a display device can immaterially be a digital video projector, an overhead projector, a plasma screen, an LCD screen or another image display screen which can be addressed by video data.

Figure 4:
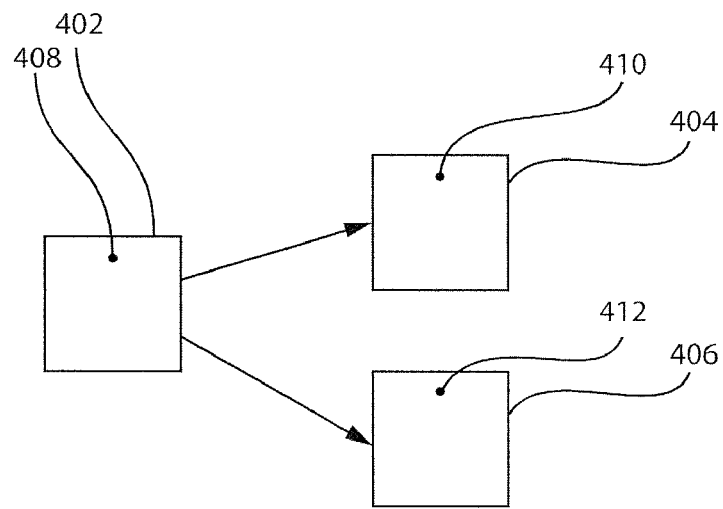
FIG. 4 represents a source image and component images.

With reference to FIG. 4, in the sequence of images to be displayed, a source image 402 is selected to be decomposed $I_{S0}$, in this case into a series of two component images $I_{C1}$ 404, $I_{C2}$ 406. Certain pixels of the two component images $I_{C1}$, $I_{C2}$ are identical to those of the source image $I_{S0}$, others are differentiated from the source image and form a plurality of differentiating pixels: $E_{C11}$, $E_{C12}$, $E_{C1j}$, …, $E_{C1q}$ for the component image $I_{C1}$, and $E_{C21}$, $E_{C22}$, …, $E_{C2j}$, …, $E_{C2q}$ for the component image $I_{C2}$. In each component image $I_{C1}$, $I_{C2}$ there are therefore q pixels being differentiated from the source image $I_{S0}$, the other pixels being identical. The number q of differentiating pixels preferably represents at least 10% of the total number of pixels of an image, so that the difference between the component images can be perceptible to the eye. The decomposition of the source image $I_{S0}$ which will be described hereinbelow aims for the fusion of the pixels $E_{C11}$ and $E_{C21}$, $E_{C12}$ and $E_{C22}$, …, $E_{C1j}$ and $E_{C2j}$, …, $E_{C1q}$ and $E_{C2q}$, of identical positions on all the component images $I_{C1}$, $I_{C2}$ to generate for the human eye a pixel that is identical to that ($E_{S01}$, $E_{S02}$, $E_{S0j}$, …, $E_{S0q}$) of the same position on the source image $1_{C1}$. By extension, it is therefore said that the source pixels ($E_{S01}$, $E_{S02}$, …, $E_{S0j}$, …, $E_{S0q}$) are decomposed into component pixels ($E_{C11}$, $E_{C12}$, …, $E_{C1j}$, …, $E_{C1q}$) for the component image $I_{C1}$, and ($E_{C21}$, $E_{C22}$, …, $E_{C21}$, …, $E_{C2q}$) for the component image $I_{C2}$.

The pixels of the source image $I_{S0}$ which are decomposed therefore form the following plurality: $E_{S01}$, $E_{S02}$, …, $E_{S0j}$, …, $E_{S0q}$. There now follows a detailed explanation of how to decompose one of these pixels, $E_{S0j}$, into pixels of the same position $E_{C1j}$ and $E_{C2j}$ respectively of the component images $I_{C1}$, $I_{C2}$, the decomposition of the other pixels of this plurality being done in the same way.

This pixel $E_{S0j}$ 408 of the source image $I_{S0}$ 402 has associated with it, as seen previously, a video data triplet ($D_{R-S0j}$, $D_{G-S0j}$, $D_{B-S0j}$); the video data triplets ($D_{R-C1j}$, $D_{G-C1j}$, $D_{B-C1j}$) ($D_{R-C2j}$, $D_{G-C2j}$, $D_{B-C2j}$) that are respectively associated with the pixels $E_{C1j}$ 410 and $E_{C2j}$ 412 of the component images $I_{C1}$ 404, $I_{C2}$ 406, and which, when they are displayed by the display device at a frequency greater than the color fusion frequency of the human eye, generate a pixel identical to $E_{S0j}$ are sought; more specifically, the video data triplets ($D_{R-C1j}$, $D_{G-C1j}$, $D_{B-C1j}$), ($D_{R-C2j}$, $D_{G-C2j}$, $D_{B-C2j}$) that give rise to the display of pixels $E_{C1j}$ and $E_{C2j}$ that are as different as possible from each other are sought, so as to enhance the scrambling of the images.

It is now considered that the triplet ($D_{R-S0j}$, $D_{G-S0j}$, $D_{B-S0j}$) associated with the pixel $E_{S0j}$ represents the coordinates of a vector $OP_{S0j}$, called "color vector", in a color space associated with the display device.

It is considered here that the video data as must be addressed to the display device is all encoded on 10 bits; each video data item can therefore take an integer value between 0 and 1023. The three columns of table 1 hereinbelow give the coordinates of color reference vectors OO, OR, OG, OB, OC, OM, OY and OW, corresponding, in row order, to black, then to each of the primaries of the device (respectively red, green and blue), then to each of the secondaries of the device (respectively cyan, magenta and yellow), then to the reference white of the device. The ends of these color reference vectors therefore delimit a cube in this color space, also called three-dimensional gamut, within which, including limits, are contained all the color vectors that are displayable by the display elements of the screen.

TABLE 1

|    | $D_R$ | $D_G$ | $D_B$ | X | Y | Z | Y | c | d |
|----|-------|-------|-------|---|---|---|---|---|---|
| OO | 0     | 0     | 0     | 0.00  | 0.00  | 0.00  | 0.00  | 0.00 | 0.00  |
| OR | 1023  | 0     | 0     | 19.19 | 8.99  | 0.97  | 8.99  | 2.13 | 0.11  |
| OG | 0     | 1023  | 0     | 10.27 | 28.28 | 2.92  | 28.28 | 0.36 | 0.10  |
| OB | 0     | 0     | 1023  | 10.02 | 3.95  | 50.64 | 3.95  | 2.54 | 12.82 |
| OC | 0     | 1023  | 1023  | 20.29 | 32.23 | 53.56 | 32.23 | 0.63 | 1.66  |
| OM | 1023  | 0     | 1023  | 29.22 | 12.94 | 51.61 | 12.94 | 2.26 | 3.99  |
| OY | 1023  | 1023  | 0     | 29.46 | 37.27 | 3.89  | 37.27 | 0.79 | 0.10  |
| OW | 1023  | 1023  | 1023  | 39.49 | 41.22 | 54.53 | 41.22 | 0.96 | 1.32  |

This video data will now be transposed into a known color space XYZ, which is independent of the device, then into a new color space Ycd, also derived from XYZ and independent of the device. In this new color space advantageously used for the implementation of the invention, the coordinates Y, c, d of each color vector OP are expressed as follows: $Y=Y$, $c=X/Y$, $d=Z/Y$. In this new color space, one of the trichromatic components Y represents the luminance of the pixel and the other two trichromatic components c, d are independent of the luminance and represent the chrominance.

Table 1 gives the correlation between the values of the coordinates of the eight color reference vectors OO, OR, OG, OB, OC, OM, OY and OW, when they are expressed in the video data space or color space specific to the device, when they are expressed in the space XYZ, and when they are expressed in the new color space used here for the decomposition.

The correlation $D_R, D_G, D_B \rightarrow XYZ$ is established in a manner known per se, for example by using known display device calorimetric characterization methods, such as those described in the standard IEC 61966. The spectral visual functions $x(\lambda)$, $y(\lambda)$, $z(\lambda)$ characteristic of the XYZ color systems can also be used. The correlation $XYZ \rightarrow Ycd$ is established as defined previously. Since the ends Q, R, G, B, C, M, Y and W of these eight different color reference vectors are peaks of the three-dimensional gamut of the device which forms a cube in the video data space, this table gives the coordinates of the peaks of this same three-dimensional gamut in the new color space. In the latter two spaces, the three-dimensional gamut forms a polyhedron, the peaks of which are formed by the ends of the eight color reference vectors OO, OR, OG, OB, OC, OM, OY and OW.

Figure 1:
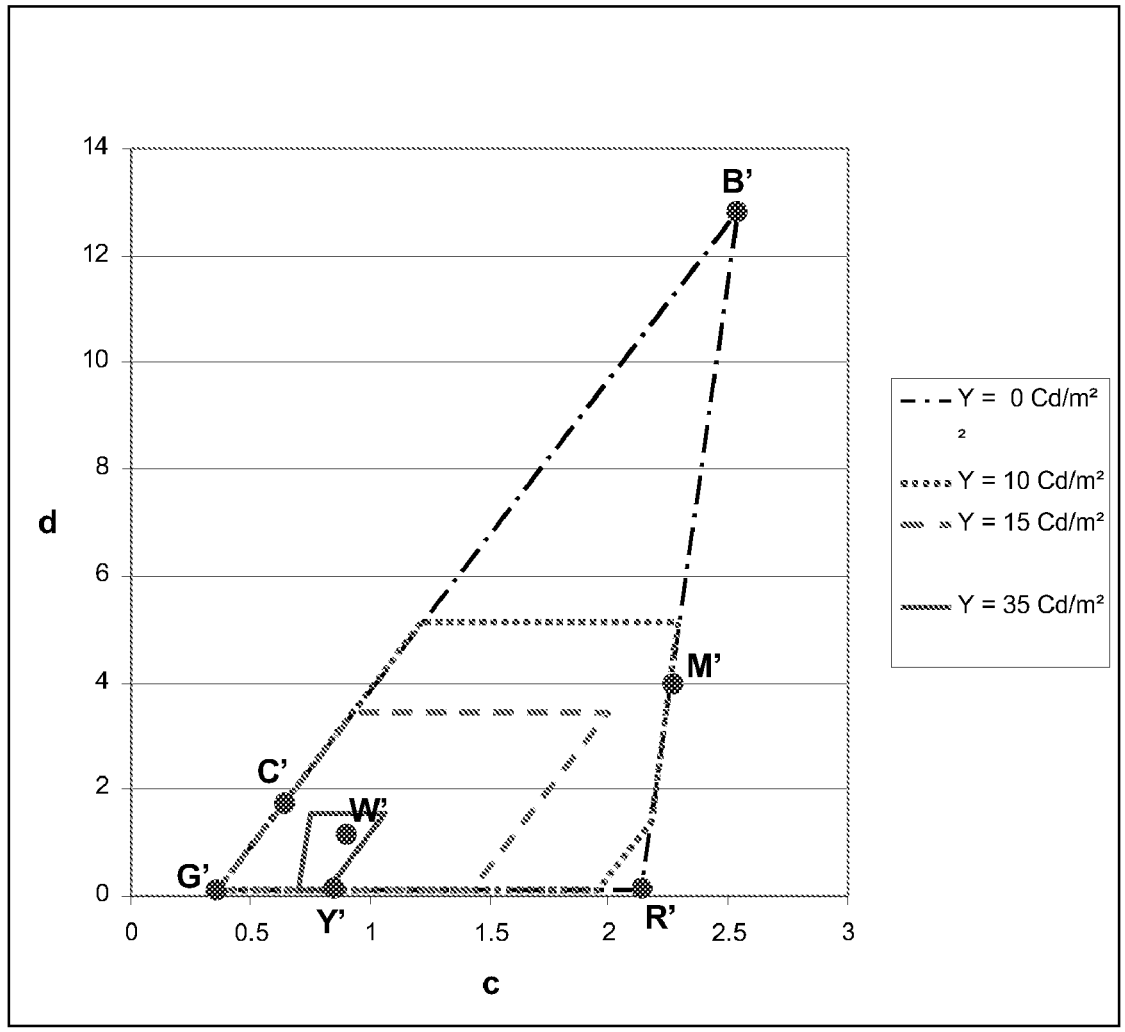
FIG. 1 represents the intersection of different constant planes Y=with the three-dimensional color gamut of the display device to which the invention is applied, a gamut that is represented in a color space (Y,c,d) independent of this device which is used in an embodiment of the invention.

FIG. 1 represents, in the two-dimensional reference frame of the chrominance components c and d, different intersections of planes Y (luminance)=constant with this polyhedral three-dimensional gamut, these planes and this gamut thus being represented in the new color space that is independent of the device defined previously: intersections of the plane Y=0 in chain dotted-lines, of the plane Y=10 in dotted lines, of the plane Y=15 in dashed lines, and of the plane Y=35 in solid lines. These intersections are limited by two-dimensional polygons. Into this two-dimensional reference frame of the chrominance components c and d, is also transferred the projection R', G', B', C', M', Y' and W' onto these planes Y=constant of the end points R, G, B, C, M, Y and W of the color reference vectors OR, OG, OB, OC, OM, OY and OW of table 1. The coordinates of these points R', G', B', C', M', Y' and W' are given in columns c and d of table 1.

There now follows a return to the pixel $E_{S0j}$ of the source image $I_{S0}$ to be decomposed, with which is associated the triplet $(D_{R-S0j}, D_{G-S0j}, D_{B-S0j})$ which represents, in the color space associated with the display device, the coordinates of the color vector $OP_{S0j}$ associated with this pixel. The triplet $(Y_{S0j}, C_{S0j}, d_{S0j})$ of the coordinates of this same color source vector $OP_{S0j}$, expressed, this time, in the new color space according to the invention, is therefore sought.

To this end, the method entails linear interpolation from color reference vectors, on the one hand which frame the color vector $OP_{S0j}$, on the other hand for which the correlation $D_R, D_G, D_B \rightarrow XYZ \rightarrow Ycd$ has been established, as mentioned previously. Such a linear interpolation method is known per se and will not be described here in detail.

There is then obtained the triplet $(Y_{S0j}, C_{S0j}, d_{S0j})$ of the coordinates of the color source vector $OP_{S0j}$ expressed in the new independent color space of the device.

Figure 2:
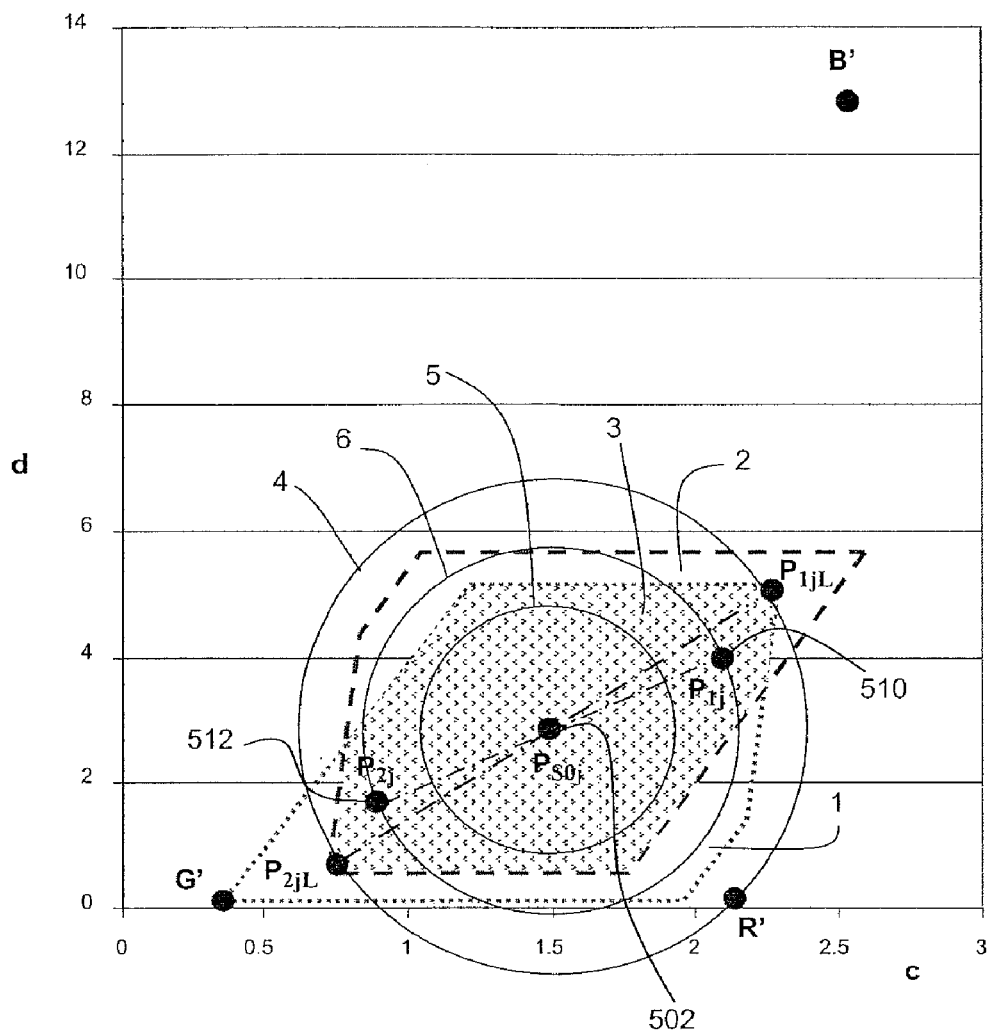
FIG. 2 represents a step for the decomposition of a color vector of a source image into two component image color vectors, in the same color space (Y,c,d) independent of this device, according to the same embodiment of the invention as that of FIG. 1.
Figure 3:
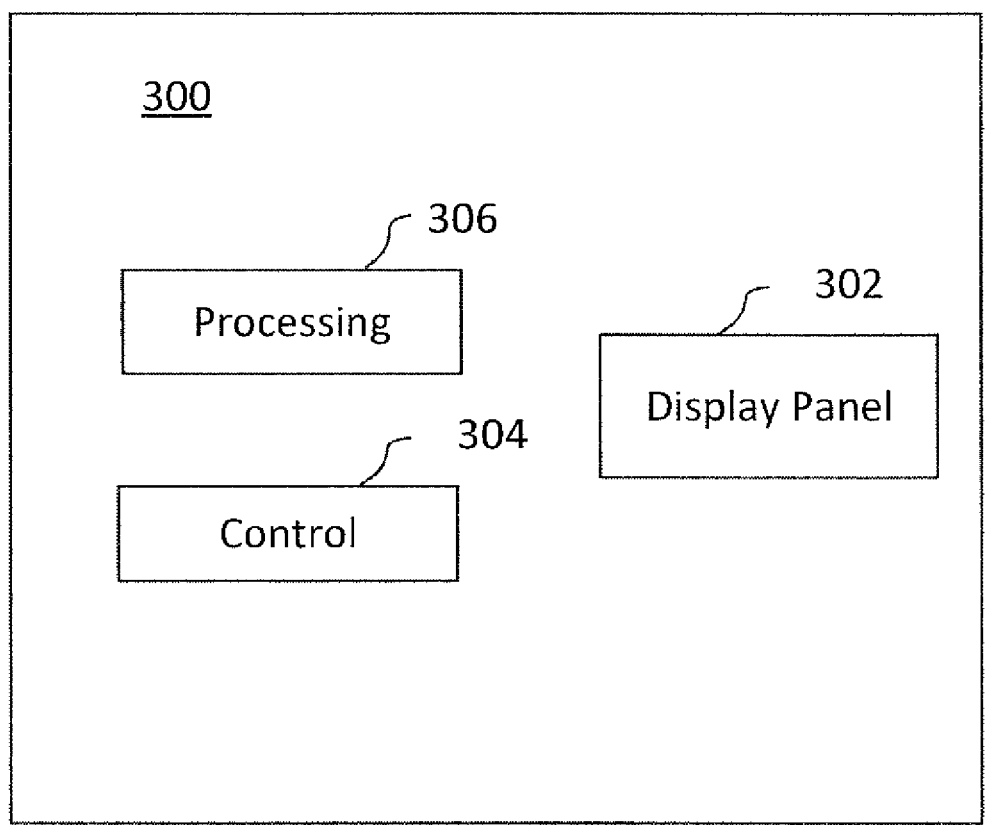
FIG. 3 represents a device for displaying a source image.
Figure 5:
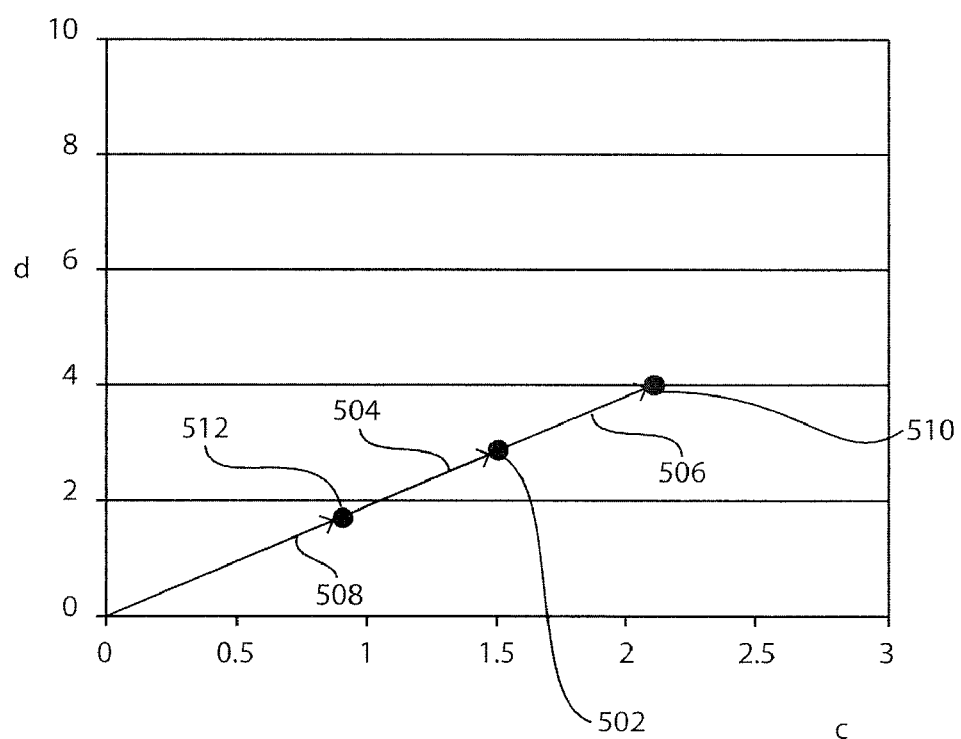
FIG. 5 represents a two-dimensional frame of reference of chrominance components that illustrates a color source vector.

With reference to FIG. 2 and FIG. 5, the intersection of the three-dimensional gamut of this device in this new color space with the plane $Y=Y_{S0j}$ is sought; this intersection forms a two-dimensional gamut 1 of luminance $Y=Y_{S0j}$, and represents the set of the colors accessible to the display device for this luminance $Y=Y_{S0j}$. In this two-dimensional gamut, the end $P_{S0j}$ 502 of the color vector $OP_{S0j}$ 504 is positioned; in the two-dimensional frame of reference of the chrominance components c and d located in this two-dimensional gamut, the coordinates of this point $P_{S0j}$ are therefore $C_{S0j}, d_{S0j}$. An area is now defined, called symmetrical two-dimensional gamut 2, which is symmetrical to the two-dimensional gamut relative to the point $P_{S0j}$, still in the same plane $Y=Y_{S0j}$; there is then defined an area, called reduced two-dimensional gamut 3, which corresponds to the intersection of the two-dimensional gamut and the symmetrical two-dimensional gamut.

The coordinates of the points which each delimit polygons (two-dimensional gamut 1, symmetrical two-dimensional gamut 2, reduced two-dimensional gamut 3) can be obtained by linear interpolation of the coordinates of the points R', G', B', C', M', Y' and W' which are given in columns c and d of table 1. These coordinates can be used to obtain the equations algebraically representing these polygons.

Concentric circles 4, 5, 6 are drawn, centered on $P_{S0j}$, which are contained in the reduced two-dimensional gamut 3 or which represent a line of intersection with this reduced two-dimensional gamut; more specifically, these circles are defined as follows:

the limit circle 4 is centered on $P_{S0j}$ and passes through the limit points $P_{1jL}$ and $P_{2jL}$, symmetrical with $P_{S0j}$, which are the furthest apart from each other in the reduced gamut 3; $L_{S0j}$ denotes the distance $P_{S0j}P_{1jL}=P_{S0j}P_{1jL}$;

the minimum circle 5 is centered on $P_{S0j}$ and has a radius equal to $0.5 \times L_{S0j}$;

the mean circle 6 is centered on $P_{S0j}$ and has a radius equal to $0.8 \times L_{S0j}$.

The radius $L_{S0j}$ of the limit circle is deduced from the equation algebraically representing the reduced two-dimensional gamut 3 and from the equation expressing that the point PS0j is the barycenter of the limit points $P_{1jL}$ and $P_{2jL}$. The factors 0.5 and 0.8 correspond to possible values of a so-called scrambling factor $K_{S0j}$ specific to the pixel $E_{S0j}$; this factor can be common to all the pixels of the source image $S_0$ to be decomposed; conversely, this factor can be variable depending on the pixels of the source image $S_0$ to be decomposed, preferably inversely proportional to the motion vector of this pixel, so as advantageously to reduce the scrambling ratio in the parts of the image subject to strong movement; it can be common to all the source images to be decomposed, or conversely be variable according to the source images. A mean image scrambling level ($K_{S0j}1=0.8$) is, for example, chosen here, which means that, to decompose the color vector $OP_{S0j}$ 504 associated with the pixel $E_{S0j}$ into two color vectors $OP_{C1j}$ 506, $OP_{C2j}$ 508 associated at the pixels $E_{C1j}$ and $E_{C2j}$ respectively of the component image $I_{C1}$ and the component image $I_{C2}$, two symmetrical points $P_{C1j}$ 510, $P_{C2j}$ 512 are chosen on the mean circle 6, and the respective coordinates $(C_{C1j}, d_{C1j})$, $(C_{C2j}, d_{C2j})$ of these points are evaluated in the previously defined two-dimensional frame of reference c, d. By choosing here points $P_{C1j}$, $P_{C2j}$ on a circle of relatively high diameter (0.8) relative to the maximum, the differences between the composite images are substantially increased, which increases the effectiveness of the scrambling.

By continuing the decomposition of the pixel $E_{S0j}$ of the source image S0 into two pixels $E_{C1j}$ and $E_{C2j}$ respectively of the component image $I_{C1}$ and the component image $I_{C2}$, $Y_{c1j}=Y_{c2j}=Y_{S0j}$ is defined, the triplets $(Y_{c1j}, c_{c1j}, d_{c1j})$, $(Y_{c2j}, c_{c2j}, d_{c2j})$ which express the coordinates of the two color vectors $OP_{c1j}$, $OP_{c2j}$ in the new color space according to the invention are obtained. By a reverse transformation of the previously defined linear interpolation which was used to switch from the expression of the coordinates of a color vector in the color space linked to the device to the expression of the coordinates of the same vector in the new color space of the invention, the triplets $(D_{R-C1j}, D_{G-C1j}, D_{B-C1j})$, $(D_{R-C2j}, D_{G-C2j}, D_{B-C2j})$ which express the coordinates of the same two color vectors $OP_{c1j}$ $OP_{c2j}$ are calculated, this time in the color space linked to the device.

Thus, when the image display device generates the succession of the component images $I_{C1}$, $I_{C2}$ at a frequency greater than the color fusion frequency of the human eye, the pixels $E_{Cj1}$ and $E_{Cj2}$ of the component images $I_{C1}$, $I_{C2}$ will be displayed successively from the following video data triplets $(D_{R-C1j}, D_{G-C1j}, D_{B-C1j})$, $(D_{R-C2j}, D_{G-C2j}, D_{B-C2j})$, which will generate, because of the fusion of the colors, a pixel identical to the pixel $E_{S0j}$ of the source image $E_{S0}$. Conversely, in the image obtained from an illegal recording using an unsynchronized camera, the observer will see two images $I_{C1}$, $I_{C2}$ appear, which will be all the more distinct as their component pixels are associated with different color vectors: for example, as defined previously, the pixels $E_{C1j}$ and $E_{C2j}$ respectively of the image $I_{C1}$ and of the image $I_{C2}$ present an optimal difference for a scrambling factor $K_{S0j}=0.8$ qualified as "mean".

This difference between the pixels of the different component images of one and the same source image can advantageously be modulated, for example by increasing the number q of differentiating pixels, for example by changing the size of the scrambling pattern. According to an advantageous variant, in each source image to be decomposed, the differentiating pixels $E_{S01}, E_{S02}, \ldots, E_{S0j}, \ldots, E_{S0q}$ are positioned in the areas of the source images where the highest distances $L_{S01}, L_{S02}, \ldots, L_{S0j}, \ldots, L_{S0q}$ (defined previously) can be obtained.

The difference between the pixels of the different component images of one and the same source image can be reinforced by increasing the scrambling factor $K_{S0j}$, notably in the range of values between 0.8 and 1 inclusive. To avoid the display defects in sequences of images having areas assigned a high amplitude motion vector, it is possible, on the contrary, to be forced to lower this scrambling factor, or even to totally cancel it, in which case the operation to decompose the pixels $E_{S0j}$ located in these areas assigned a high amplitude motion vector is squarely eliminated; preferably, this scrambling factor remains greater than or equal to 0.5 to maintain a sufficient difference between the component images.

In the description of the present invention, the transformations of the expression of the coordinates of the color vectors between different color spaces have been achieved by linear interpolation; other known transformation types can be used without departing from the invention.

The present invention has been described with reference to a decomposition of source images into two component images; decompositions into a higher number of component images can be considered without departing from the invention; to generalize, a source image can thus be decomposed into a series of n "component" images: $I_{C1}, I_{C2}, \ldots, I_{Ck}, \ldots, I_{Cn}$; according to a variant, the number n can vary according to the source image to be decomposed; indeed, since the color fusion frequency depends on the luminosity of the images, it is possible to envisage a higher number n for low fusion frequencies, and vice-versa.

Other color spaces can be envisaged for decomposition the source images optimally without departing from the invention. Preferably, a perceptually uniform space is chosen. For the perceptually uniform decomposition space, it is possible to choose the space CIE-LAB (also called Lab), the space CIE-LUV (also called Luv), or the space QMH, or even the space JCH; for the space QCH, Q designates the brightness, C the colorfulness, and H the huequadrature or hueangle; for the space JCH, J designates the lightness, C designates the "chroma", and H as previously designates the hue. The choice of such a perceptually uniform space advantageously makes it possible to even further heighten the differences between the component images, this time as they are perceived by the human eye, which further reinforces the scrambling level; indeed, the choice of such a color space makes it possible to specifically maximize the perception differences between the component images of one and the same source image.

The example that has just been described can be implemented by using, this time, space transformation formulae adapted to the perceptually uniform space, formulae that are within the scope of those skilled in the art. It will be observed that by performing the decomposition in a space LAB in the same way as in the space Ycd as described previously, substantially different component images are obtained for one and the same source image. It can be seen that the use of a perceptually uniform space for the decomposition makes it possible to enhance the scrambling of the images.

The invention applies to other embodiments of the method of displaying a sequence of images, without departing from the scope of the claims hereinafter.

The invention claimed is:

1. A method of processing a source image, in which said source image is decomposed by a hardware element in a decomposition color space into a series of n component images and in which each source pixel which belongs to a plurality of decomposed pixels of this source image has a corresponding series of component pixels respectively in each of said component images, wherein,
if, in said decomposition space, the set of the color vectors accessible to a display device intended to display said source image forms a three-dimensional gamut of colors,
and if, for each source pixel which belongs to said plurality of decomposed pixels, a source point $P_{S0j}$ is used to represent the end of the color source vector $OP_{S0j}$ associated with said source pixel $E_{S0j}$, and component points $P_{1j}, P_{2j}, \ldots, P_{kj}, \ldots, P_{nj}$ are used to represent the ends of the color component vectors $OP_{1j}, OP_{2j}, \ldots, OP_{kj}, \ldots, OP_{nj}$ associated with said component pixels of the series which corresponds to said source pixel, said source image is decomposed such that, for each source pixel of said plurality, said component points $P_{1j}, P_{2j}, \ldots, P_{kj}, \ldots, P_{nj}$ associated with the component pixels corresponding to said source pixel are all located in said three-dimensional color gamut and the barycenter of said component points $P_{1j}, P_{2j}, \ldots, P_{kj}, \ldots, P_{nj}$ corresponds to said source point $P_{S0j}$, wherein, for each source pixel of said plurality, if, still within said decomposition space, there is defined a limit sphere which is centered on the source point $P_{S0j}$ associated with said source pixel and the surface of which contains a series of n limit points $P_{1jL}, P_{2jL}, \ldots, P_{kjL}, \ldots, P_{njL}$, the barycenter of which approximately coincides with the source point $P_{S0j}$ and which present the greatest possible distance between them while being included, including limits, in said three-dimensional gamut, and, if a scrambling factor $K_{S0j}$ of said source pixel $E_{S0j}$ of said source image $I_{S0j}$ is defined which is less than or equal to 1 and greater than or equal to 0.5, said source image is also decomposed such that the distances between said source point $P_{S0j}$ and each of said component points $P_{1j}, P_{2j}, \ldots, P_{kj}, \ldots, P_{nj}$ associated with the component pixels corresponding to said source pixel are all greater than or equal to $K_{S0j}$ times the radius $L_{S0j}$ of said limit sphere.

2. The method of processing a source image as claimed in claim 1, wherein said decomposition space is a perceptually uniform color space.

3. The method of processing a source image as claimed in claim 1, wherein said decomposition space comprises the absolute luminance quantity and wherein, one of the coordinates of said source point $P_{S0j}$ then corresponding to a luminance $Y_{S0j}$, then, to decompose said source image, the series of the n limit points $P_{1jL}, P_{2jL}, \ldots, P_{kjL}, \ldots, P_{njL}$, and the series of the n component points $P_{1j}, P_{2j}, \ldots, P_{kj}, \ldots, P_{nj}$ are chosen in the same constant luminance plane corresponding to the luminance coordinate $Y_{S0j}$ of said source point.

4. The method of processing a source image as claimed in claim 1, wherein, to decompose said source image, the series of the n component points $P_{1j}, P_{2j}, \ldots, P_{kj}, \ldots, P_{nj}$ are chosen so as not to belong to any plane perpendicular to one of the reference axes of said decomposition space.

5. The method of processing a source image as claimed in claim 1, wherein said scrambling factor $K_{S0} = K_{S0j}$ is common to said plurality of decomposed pixels of said source image $I_{S0j}$.

6. The method of processing a source image as claimed in claim 1, wherein said scrambling factor $K_{S0j}$ is greater than or equal to 0.8.

7. The method of processing a source image as claimed in claim 1, wherein said component points form edges of a polyhedron, wherein said polyhedron is equilateral and centered on said source point $P_{S0}$.

8. A method of processing a sequence of source images in which each of said images is processed as claimed in claim 1, wherein decompositions of said source images are performed so that the succession of the series of component pixels corresponding to the decomposed pixels of these source images give rise to a fluctuation of luminance at a frequency less than the flicker limit frequency of the human eye.

9. A method of displaying a sequence of source images at a given source frequency, comprising at least one series of component images obtained by the processing of a sequence of source images as claimed in claim 8, in which, for each source image to be displayed, each of said corresponding component images is displayed in succession at a component frequency equal to n times said source frequency, wherein said component frequency is greater than the color fusion frequency of the human eye.

10. The method of processing a sequence of source images in which at least one of said images is processed as claimed in claim 1, wherein, if each source pixel of at least one processed source image $I_{S0}$ which belongs to said plurality of decomposed pixels has associated with it a motion vector and there is defined an upper scrambling limit $M_{S0q}$ of said source pixel $E_{S0q}$ which is greater than the scrambling factor $K_{S0j}$ associated with said source pixel and which is such that the distances between the end $P_{S0j}$ of the color source vector associated with said source pixel and each of the ends $P_{1j}, P_{2j}, \ldots, P_{kj}, \ldots, P_{nj}$ of the color component vectors associated with the component pixels corresponding to said source pixel are all less than or equal to $M_{S0j}$ times the radius $L_{S0j}$ of the limit sphere associated with said source pixel, then, for each of said source pixels of said plurality, said upper scrambling limit $M_{S0j}$ is inversely proportional to the modulus of the motion vector of said source pixel.

11. The method of processing a sequence of source images as claimed in claim 10, wherein, for each of said source pixels of said plurality, said scrambling factor $K_{S0j}$ associated with said source pixel is inversely proportional to the modulus of the motion vector of this source pixel.

12. A method of displaying a sequence of source images at a given source frequency, comprising at least one series of component images obtained by the processing of a sequence of source images as claimed in claim 10, in which, for each source image to be displayed, each of said corresponding component images is displayed in succession at a component frequency equal to n times said source frequency, wherein said component frequency is greater than the color fusion frequency of the human eye.

13. A method of displaying a sequence of source images at a given source frequency, comprising at least one series of component images obtained by the processing of at least one source image $I_{S0}$ as claimed in claim 1, in which, for each source image to be displayed, each of said corresponding component images is displayed in succession at a component frequency equal to n times said source frequency, wherein said component frequency is greater than the color fusion frequency of the human eye.

14. A device for displaying a source image in which each pixel is associated with a video data triplet, comprising:

a display panel comprising a two-dimensional matrix of elementary polychrome displays;

control element able to control each elementary display using a video data triplet associated with a pixel so as to obtain the display of this pixel;

a processing element able to perform a process on the source image to be displayed so as to generate a series of n component images of said source image;

wherein said control element is adapted to successively display each component image at a frequency greater than a color fusion frequency of a human eye; and wherein, in said process, said source image is decomposed in a decomposition color space into the series of n component images and each source pixel which belongs to a plurality of decomposed pixels of this source image has a corresponding series of component pixels respectively in each of said component images, wherein, if, in said decomposition space, the set of the color vectors accessible to a display device intended to display said source image forms a three-dimensional gamut of colors, and if, for each source pixel which belongs to said plurality of decomposed pixels, a source point $P_{S0j}$ is used to represent the end of the color source vector $OP_{S0j}$ associated with said source pixel $E_{SOj}$, and component points $P_{1j}, P_{2j}, \ldots, P_{kj}, \ldots, P_{nj}$ are used to represent the ends of the color component vectors $OP_{1j}, OP_{2j}, \ldots, OP_{kj}, \ldots, OP_{nj}$ associated with said component pixels of the series which corresponds to said source pixel, said source image is decomposed such that, for each source pixel of said plurality, said component points $P_{1j}, P_{2j}, \ldots, P_{kj}, \ldots, P_{nj}$ associated with the component pixels corresponding to said source pixel are all located in said three-dimensional color gamut and the barycenter of said component points $P_{1j}, P_{2j}, \ldots, P_{kj}, \ldots, P_{nj}$ corresponds to said source point $P_{SOj}$, wherein, for each source pixel of said plurality, if, still within said decomposition space, there is defined a limit sphere which is centered on the source point $P_{SOj}$ associated with said source pixel and the surface of which contains a series of n limit points $P_{1jL}, P_{2jL}, \ldots, P_{kjL}, \ldots, P_{njL}$, the barycenter of which approximately coincides with the source point $P_{SOj}$ and which present the greatest possible distance between them while being included, including limits, in said three-dimensional gamut, and, if a scrambling factor $K_{SOj}$ of said source pixel $E_{SOj}$ of said source image $I_{SOj}$ is defined which is less than or equal to 1 and greater than or equal to 0.5, said source image is also decomposed such that the distances between said source point $P_{SOj}$ and each of said component points $P_{1j}, P_{2j}, \ldots, P_{kj}, \ldots, P_{nj}$ associated with the component pixels corresponding to said source pixel are all greater than or equal to $K_{SOj}$ times the radius $L_{SOj}$ of said limit sphere.

* * * * *